United States Patent [19]
Shoji et al.

[11] Patent Number: 4,782,406
[45] Date of Patent: Nov. 1, 1988

[54] DATA TRANSFER APPARATUS WITH A DISKLIKE RECORD MEDIUM AND A METHOD OF OPERATION THEREFORE

[75] Inventors: Makoto Shoji, Fussa; Hiroshi Tsuyuguchi, Tokyo; Shozo Toma, Kokubunji; Kazuhiro Hiraki, Mitaka; Tsutomu Morita, Musashino, all of Japan

[73] Assignee: Teac Corporation, Tokyo, Japan

[21] Appl. No.: 133,162

[22] Filed: Dec. 11, 1987

Related U.S. Application Data

[63] Continuation of Ser. No. 699,078, Feb. 7, 1985, abandoned.

[30] Foreign Application Priority Data

Feb. 10, 1984 [JP] Japan .................................. 59-24010

[51] Int. Cl.$^4$ ......................... G11B 5/55; G11B 19/02; G11B 21/02
[52] U.S. Cl. ....................................... 360/78; 360/69; 360/75; 360/97
[58] Field of Search ................. 360/69, 75, 78, 97-99, 360/105, 106, 107, 109; 318/685, 696

[56] References Cited

U.S. PATENT DOCUMENTS

| | | | |
|---|---|---|---|
| 4,005,493 | 1/1977 | Morgan | 360/109 |
| 4,568,988 | 2/1986 | McGinlay et al. | 360/78 |
| 4,583,133 | 4/1986 | Shoji et al. | 360/69 |
| 4,593,329 | 6/1986 | Hayakawa | 360/75 |
| 4,594,620 | 6/1986 | Shoji et al. | 360/75 |

FOREIGN PATENT DOCUMENTS

| | | | |
|---|---|---|---|
| 58-134357 | 10/1981 | Japan | 360/99 |
| 57-164473 | 10/1982 | Japan | 360/69 |
| 58-29177 | 2/1983 | Japan | 360/97 |
| 58-164062 | 9/1983 | Japan | 360/97 |
| 58-211359 | 12/1983 | Japan | 360/137 |
| 59-104761 | 6/1984 | Japan | 360/99 |
| 59-119575 | 7/1984 | Japan | 360/93 |
| 59-198562 | 11/1984 | Japan | 360/69 |

OTHER PUBLICATIONS

Digital Circuits and Devices, Prentice-Hall, Inc. Kohonen, 1972, pp. 81-92.
Patent Abstracts of Japan vol. 8 No. 58 (p. 261) 58-205955, Nakagawa, 12/83.
Digital Design, Nov. 1977, "Floppy Drive Innovations: Challenging Hard Disks" pp. 8-10.

Primary Examiner—Raymond F. Cardillo
Assistant Examiner—Steven R. Garland
Attorney, Agent, or Firm—Woodcock Washburn Kurtz Mackiewicz & Norris

[57] ABSTRACT

A data transfer apparatus for use with a replaceable disklike record medium such as a flexible magnetic disk having data storage tracks thereon, comprising a disk drive motor for imparting rotation to the record medium, and a head transport motor for transporting a transducer head or heads radially of the record medium so as to enable the transducer head or heads to access the individual data storage tracks on the record medium for data transfer therewith. Also included is a control and drive circuit for controllably energizing the head transport motor. When the disk drive motor is out of rotation, the control and drive circuit holds the supply voltage of the head transport motor zero, or lower than its normal operating voltage for head transportation, for saving power. Then, as the disk drive motor is set into rotation, the control and drive circuit applies the normal operating voltage to the head transport motor preparatory to the commencement of data transfer, thereby automatically recorrecting the head position on the record medium.

5 Claims, 10 Drawing Sheets

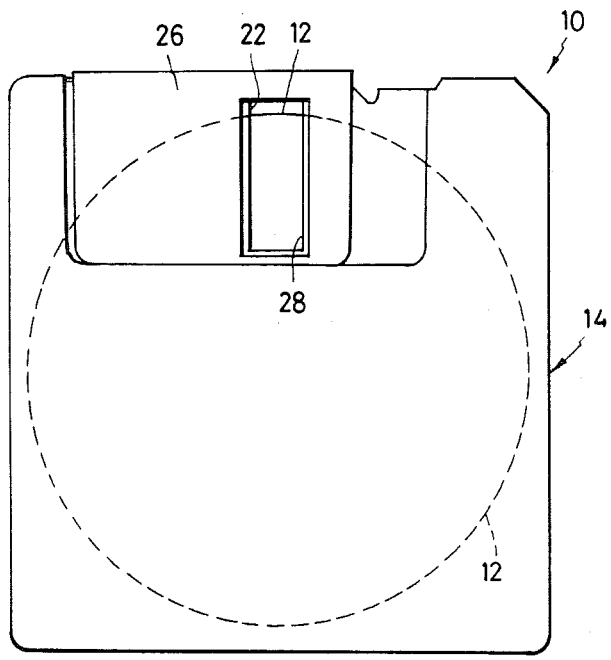
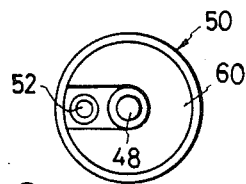
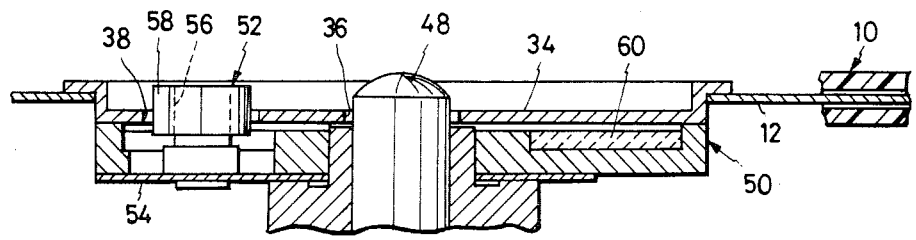

DATA TRANSFER APPARATUS WITH A DISKLIKE RECORD MEDIUM AND A METHOD OF OPERATION THEREFORE

This is a continuation of application Ser. No. 699,078 filed Feb. 7, 1985 now abandoned.

BACKGROUND OF THE INVENTION

Our invention relates to an apparatus for data transfer with interchangeable disklike record media such as flexible magnetic disks which may be packaged in cassette or cartridge form. More specifically, our invention deals with such a data transfer apparatus having a disk drive motor for imparting rotation to the record medium, and a head transport motor for transporting a transducer head, or a pair of such heads, radially of the record medium for accessing the individual data storage tracks thereon. Our invention is also specifically directed to a method of operation for such a data transfer apparatus.

Generally, in data transfer apparatus of the type in question, the head transport motor is what is known as a stepping motor, having a rotor that rotates in short and essentially uniform angular movements, rather continuously, in response to stepping pulses supplied from an external control. The stepwise rotation of the head transport motor is translated by a suitable rotary to linear converter into the linear stepwise motion of the transducer head or heads for track to track accessing on the record disk.

A problem has existed with this type of head transport motor in data transfer apparatus. Transported to any desired track position on the record disk, the transducer head or heads must be held in that position until the head transport motor rotates in response to the the next series of stepping pulses. The rotor of the head transport motor must of course be retained in a corresponding angular position with respect to the fixed windings of the motor in order to hold the transducer head or heads in the desired track position. Take, for example, a four phase stepping motor of one phase drive. If the third phase windings of this motor have been energized by the last of the preceding series of stepping pulses, the rotor must be held opposite the third phase windings pending the next series of stepping pulses.

A conventional solution to this problem has been to continue, during the absence of stepping pulses, the energization of the head transport motor windings that have been energized by the last of the preceding series of stepping pulses, with a current of either the same magnitude as that during stepping operation or of a smaller magnitude for saving power. We object to the continued energization of the head transport motor as it involves a considerable waste of energy. It is difficult, however, to hold the rotor in the exact angular position required if the motor is energized with a current of the smaller magnitude, and even more difficult if the motor is deenergized. Particularly if the motor is deenergized, the rotor is very likely to be displaced up to approximately 10 to 20 microns from the required angular position, being no longer electromagnetically retained in that position. Such undesired displacement of the rotor, and in consequence of the transducer head or heads with respect to the tracks of the record disk, will also occur because of mechanical vibrations or shocks produced as when the disk drive motor is set into or out of rotation or when the disk is loaded into or unloaded from the apparatus.

SUMMARY OF THE INVENTION

We have hereby succeeded in eliminating the waste of power due to the continuous energization of the head transport motor in data transfer apparatus of the type under consideration without giving rise to the undesired displacement of the head transport motor rotor with respect to its fixed windings and, therefore, of the transducer head or heads on the disklike record medium for use with the apparatus.

Briefly, our invention provides a data transfer apparatus, and a method of operation therefor, for use with a replaceable disklike record medium such as a flexible magnetic disk having data storage tracks thereon, comprising a disk drive motor for imparting rotation to the record medium, at least one transducer head for data transfer with the record medium while the latter is in rotation at a predetermined normal speed, and a head transport motor for transporting the transducer head radially of the record medium so as to enable the transducer head to access the individual data storage tracks thereon. Also included is a control and drive circuit for controllably energizing the head transport motor. The control and drive circuit is adapted to impress a first supply voltage, sufficiently high to correct the position of the transducer head on the record medium, to the head transport motor at least during at least part of the period from the moment the disk drive motor is set into rotation to the moment the speed of rotation of the disk drive motor becomes sufficiently high for the commencement of data transfer between the record medium and the transducer head, and during the period when the head transport motor is in rotation to transport the transducer head from track to track on the record medium in response to stepping pulses. The control and drive circuit is further adapted to impress a second supply voltage, lower than the first supply voltage, to the head transport motor at least during at least part of the period from the moment the disk drive motor is set out of rotation to the beginning of said at least part of the period during which the first supply voltage is impressed to the head transport motor.

In short, according to our invention summarized above, the control and drive circuit holds the supply voltage of the head transport motor zero, or lower (e.g. five volts) than its normal operating voltage (e.g. 12 volts) for head transportation, for saving power when the disk drive motor is out of rotation. Then, as the disk drive motor is set into rotation, the control and drive circuit applies the normal operating voltage to the head transport motor during all or part of the period from the moment the disk drive motor is set into rotation to the moment the speed of rotation of the disk drive motor, and therefore of the record disk, becomes sufficiently high for the commencement of data transfer.

Even though the rotor of the head transport motor may be angularly displaced for some reason or other while its supply voltage is being held at zero or lower than its normal operating value, the high operating voltage impressed subsequently to the head transport motor causes the rotor to return to the required angular position. Data transfer can therefore be initiated immediately thereafter with the transducer head or heads exactly in the required track position on the record medium. We have thus attained the objective of saving power without head displacement.

The above and other features and advantages of our invention and the manner of realizing them will become more apparent, and the invention itself will best be understood, from a study of the following description and appended claims, with reference had to the attached drawings showing some preferred embodiments of our invention.

BRIEF DESCRIPTION OF THE DRAWINGS

FIG. 3 is a view similar to FIG. 1 except that the sliding shutter of the disk cassette is shown opened to expose parts of the opposite surfaces of the magnetic disk;

FIG. 5 is a top plan view of the turntable in the data transfer apparatus of FIG. 4, shown together with the spindle and drive pin thereon;

FIG. 6 is an enlarged axial section through the turntable of FIG. 5, the view also showing fragmentarily the disk cassette of FIGS. 1 through 3 mounted in position on the turntable in proper engagement therewith;

FIG. 9, consisting of (A)–(N), is a series of waveform diagrams useful in explaining the operation of the data transfer apparatus in accordance with our invention, the waveforms being plotted on the assumption that the disk cassette of FIGS. 1 through 3 has already been loaded on the turntable when the apparatus is electrically turned on;

FIG. 10, consisting of (A)–(N), is also a series of waveform diagrams similar to FIG. 9 except that the waveforms are plotted on the assumption that the disk cassette is loaded on the turntable after the apparatus has been electrically turned on;

DESCRIPTION OF THE PREFERRED EMBODIMENTS

Figure 1:
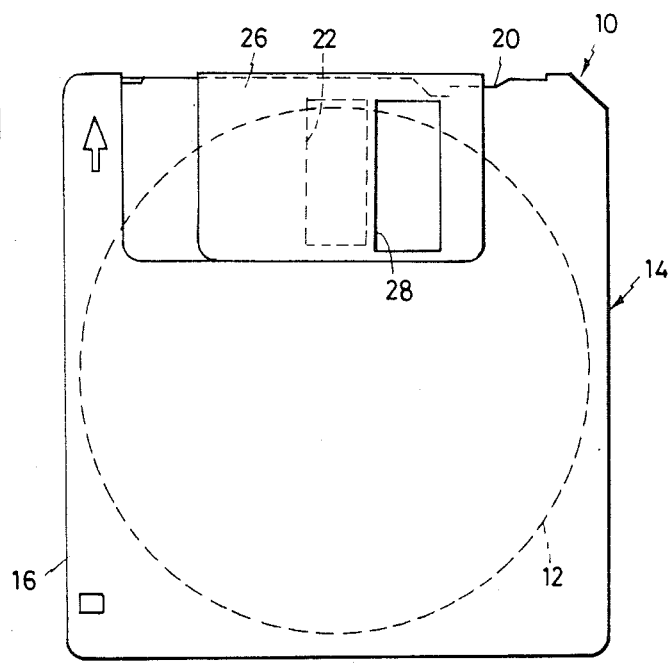
FIG. 1 is a top plan view of a flexible magnetic disk cassette for use with the data transfer apparatus in accordance with our invention, with the sliding shutter of the disk cassette shown closed.
Figure 2:
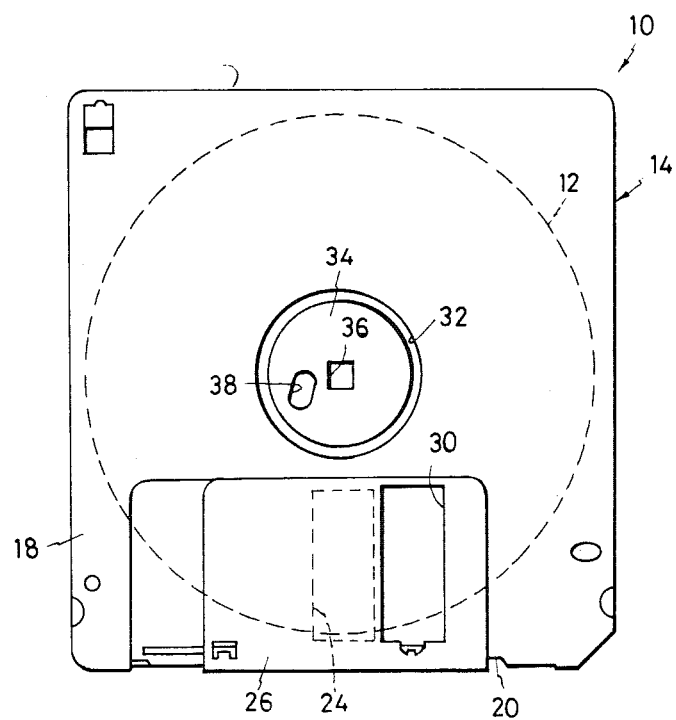
FIG. 2 is a bottom plan view of the disk cassette of FIG. 1.

We will disclose the data transfer apparatus of our invention as adapted, by way of example only, for use with the flexible magnetic disk cassette illustrated in FIGS. 1 through 3 and therein generally designated 10. With particular reference to FIGS. 1 and 2 the exemplified disk cassette 10 has a flexible magnetic disk 12, with a diameter of 3.5 inches (86 millimeters), housed in a protective envelope 14 of relatively rigid plastics material. The envelope 14 is of generally flat, approximately square boxlike shape, comprising a pair of opposite main sides 16 and 18 oriented parallel to the magnetic disk 12. The disk cassette 10 is to be loaded horizontally in an associated disk drive, to be set forth presently, with its side 16 directed upwardly and with its edge 20 foremost. We will therefore hereinafter refer to the side 16 as the top side, the other side 18 as the bottom side, and the edge 20 as the front edge.

Formed in both top 16 and bottom 18 sides of the envelope 14, in the vicinity of its front edge 20, are apertures 22 and 24 to expose radial portions of the opposite surfaces of the magnetic disk 12 for data transfer contact with a transducer head or a pair of transducer heads, yet to be described, depending upon whether one or both surfaces of the magnetic disk are used for data storage. Normally, the apertures 22 and 24 are held closed by a sliding shutter 26 in the form of a sheet of aluminum, stainless steel or like material bent into the shape of a U to fit over the front edge 20 of the envelope 14. The shutter 26 has itself two apertures 28 and 30 which are out of register with the envelope apertures 22 and 24 when the shutter is in the normal or right hand position of FIGS. 1 and 2 under the bias of a spring (not shown). When the disk cassette 10 is loaded fully into the disk drive, the shutter 26 will be forced leftwardly by a shutter opening lever, not shown, included in the disk drive against the bias of the unshown spring. Then, as illustrated in FIG. 3, the shutter 26 will bring its apertures 28 and 30 into register with the envelope apertures 22 and 24, respectively, thereby exposing the radial portions of the opposite faces of the magnetic disk 12 for data transfer contact with the transducer heads of the data transfer apparatus 10.

The magnetic disk cassette 10 is to be placed upon the turntable of the disk drive with the top side 16 of its envelope 14 oriented upwardly. Thus, as seen in FIG. 2, the bottom side 18 of the envelope 14 has a circular opening 32 defined centrally therein to allow engagement of the magnetic disk 12 with the turntable. Exposed through the central opening 32 is a hub 34 in the form of a disk of magnetic sheet metal attached centrally to the magnetic disk 12. The hub 34 has a first opening in the form of a square hole 36 defined centrally therein, and a second opening in the form of a short slot 38 defined eccentrically therein.

Figure 4:
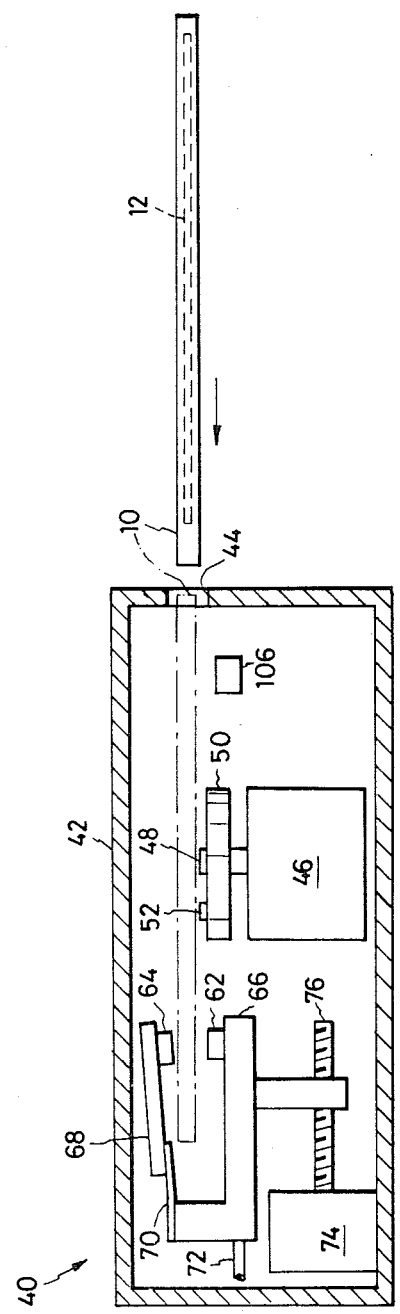
FIG. 4 is a vertical section through the data transfer apparatus for use with the disk cassette of FIGS. 1 through 3, with the internal construction of the apparatus being shown diagrammatically to an extent necessary for a full understanding of our invention.

We have diagrammatically illustrated in FIG. 4 the general organization of the disk drive 40 for use with the magnetic disk cassette 10 of FIGS. 1 through 3. The disk drive 40 has a generally boxlike housing 42 having an entrance slot or opening 44 defined therein. As depicted also in this figure, the disk cassette 10 is to be inserted in the entrance slot 44 with its front edge 20 foremost and with its top side 16 directed upwardly. Within the housing 42 there is provided a disk drive motor 46 which is preferably of the known rotor outside stator configuration; that is, the rotor is arranged outside the stator for joint rotation with an output shaft serving as a spindle 48 on which a turntable 50 is directly mounted in a coaxial relation thereto.

As better illustrated in FIGS. 5 and 6, the spindle 48 partly projects upwardly of the turntable 50 for engagement in the center hole 36 in the hub 34 of the magnetic disk 12 of the disk cassette 10. A retractable drive pin 52 is mounted eccentrically on the turntable 50 for engagement in the eccentric slot 38 in the disk hub 34. The drive pin 52 is supported by the turntable 50 via a leaf spring 54 which allows retraction of the drive pin into the turntable 50, in a direction parallel to the axis of the spindle 48. The drive pin 52 is shown to comprise an upstanding shaft 56 on the leaf spring 54, and a roll 58 rotatably mounted thereon. Also mounted on the turntable 50 is a permanent magnet 60 of substantially annular shape for attracting the metal made hub 34 of the magnetic disk 12.

With reference back to FIG. 4 the disk drive 40 is shown to have a pair of magnetic transducer heads 62 and 64 arranged within the housing 42 for data transfer with the opposite faces of the magnetic disk 12 through the apertures 22 and 24 in its envelope 14 and the apertures 28 and 30 in the sliding shutter 26. The lower transducer head 62 is mounted directly on a carriage 66, whereas the upper transducer head 64 is mounted on this carriage via a support arm 68 and a cantilever spring 70, with the latter biasing the upper transducer head into engagement with the magnetic disk 12. Normally, however, or when the disk cassette 10 is not loaded in the disk drive 40, the upper transducer head 64 is held away from the lower transducer head 62 against the bias of the cantilever spring 70. The upper transducer head 64 is allowed to move into contact with the magnetic disk 12 under the force of the cantilever spring 70 when the disk cassette 10 is loaded in the disk drive 40. As the upper transducer head makes data transfer contact with one surface of the magnetic disk 12, so does the lower transducer head 62 with the other surface of the magnetic disk.

The carriage 66 is reciprocably movable along a pair of guide rods 72, one seen, for transporting the pair of transducer heads 62 and 64 radially of the magnetic disk 12 for track to track accessing in the well known manner. Employed for such linear travel of the carriage 66 is a head transport motor 74 of the electrical stepping type which is coupled to the carriage via a suitable rotary to linear converter herein shown as a lead screw 76.

When initially inserted in the disk drive 40 through its entrance slot 44, the disk cassette 10 is to occupy the phantom position of FIG. 4, a slight distance over the turntable 50, in which the magnetic disk 12 is in axial alignment with the turntable. The pair of transducer heads 62 and 64 are of course held away from the disk cassette 10 during the loading thereof. Then the disk cassette 10 is lowered onto the turntable 50, either manually or automatically by a cassette transport mechanism of any known or suitable construction. The spindle 48 will then be engaged in the center hole 36 in the disk hub 34 of the lowered disk cassette 10. The drive pin 52, however, will most likely be not engaged in the eccentric slot 38 in the disk hub 34; instead, the drive pin will be depressed into the turntable 50, both under the weight of the magnetic disk 12 and by the attractive force of the permanent magnet 60 on the turntable, against the force of the leaf spring 54. The turntable 50 must be revolved relative to the magnetic disk 12 by the disk drive motor 46 for the engagement of the drive pin 52 in the eccentric slot 38 in the disk hub 34. The drive pin 52 will engage in the eccentric slot 38 under the force of the leaf spring 54 when the drive pin reaches a position of register with the eccentric slot.

Figure 7:
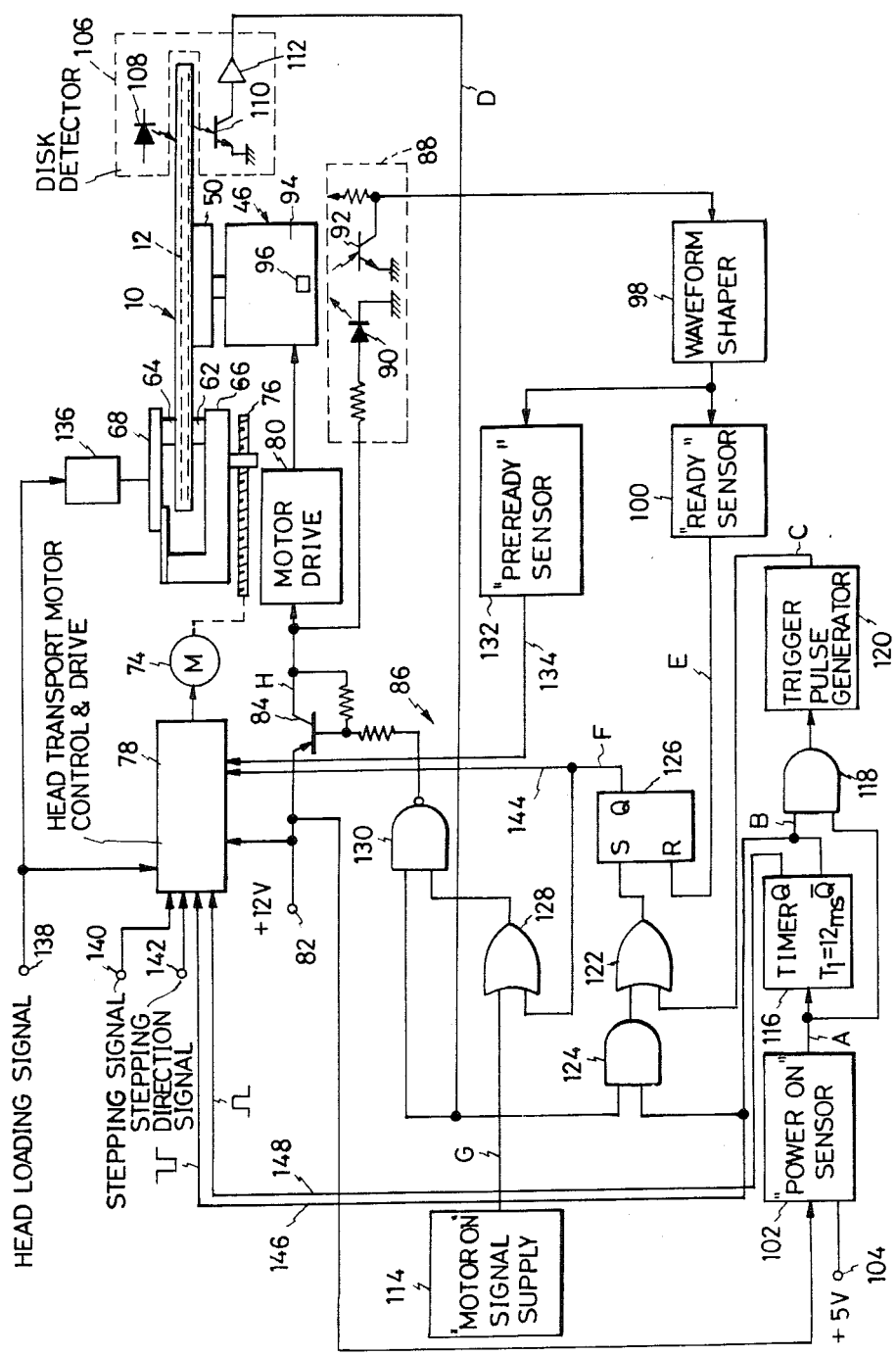
FIG. 7 is a block diagram of the electrical configuration of the data transfer apparatus of FIG. 4, incorporating the novel concepts of our invention.

Shown in FIG. 7 is the electrical circuitry incorporated in the disk drive 40 and associated host equipment to embody the novel concepts of our invention. FIG. 7 also shows the disk cassette 10 mounted in place on the turntable 50, with its magnetic disk 12 caught between the pair of transducer heads 62 and 64 for data transfer therewith.

The head transport motor 74 is of the four phase construction, energized in the single phase drive mode from its control and drive circuit 78, in this particular embodiment. However, when the power switch, not shown, of the data transfer system comprising the disk drive 40 and its host equipment is closed, not only the first phase windings but also at least either of the second to fourth phase windings of the head transport motor 74 are to be energized in order to prevent its rotor from becoming stationary in its angular position opposite the third phase windings. The pair of transducer heads 62 and 64 will then positively return to the "track zero" positions on the magnetic disk 12 on the turntable 50 upon closure of the unshown power switch, although this manner of head transport motor energization constitutes no essential feature of our present invention.

The disk drive motor 46 is electrically connected to and operated by a drive circuit 80. This drive circuit is connected to a first direct current power supply terminal 82 of, say, 12 volts via a switching transistor 84. Power is supplied from the first supply terminal 82 upon closure of the unshown power switch of the data transfer system. Because of the provision of the switching transistor 84, however, the disk drive motor 46 is not set into operation unless conduction is caused through the switching transistor by a switch control circuit, generally designated 86, to which we will refer subsequently.

The reference numeral 88 generally denotes a revolution sensor associated with the disk drive motor 46 and employed for sensing the angular orientation of the magnetic disk 12 on the turntable 50 and the speed of its rotation. The revolution sensor 88 comprises a light source such as a light emitting diode (LED) 90 and a photodetector such as a phototransistor 92. The LED 90 sheds light on the rotor 94 of the disk drive motor 46, and the phototransistor 92 receives the light that has been reflected by a reflector 96 in a prescribed position on the rotor. The angular position of the reflector 96 on the disk drive motor rotor 94 has a predetermined relation to that of the drive pin 52 on the turntable 50. It is therefore possible to ascertain, upon engagement of the drive pin 52 in the eccentric slot 38 in the disk hub 34, the angular orientation of of the magnetic disk 12 from the output from the revolution sensor 88. Preferably, and as shown, the LED 90 is connected to the first supply terminal 82 via the switching transistor 84 and, in consequence, is fed therefrom only during the rotation of the disk drive motor 46 in order to avoid waste of power.

The output of the revolution sensor 88, or of its phototransistor 92, is connected to a shaping circuit 98. It is the office of the shaping circuit 98 to put out discrete pulses representative of the detections of the reflector 96 on the disk drive motor rotor 94 by the revolution sensor 88. It is possible to ascertain the angular orientation of the magnetic disk 12 on the turntable 50 from the relative positions of the output pulses of the shaping circuit 98, and also the speed of revolution of the magnetic disk from the spacings between the shaping circuit output pulses.

Connected to the output of the shaping circuit 98 is a "ready" sensor circuit 100 which, in response to the output pulses of the shaping circuit, puts out a signal indicative of the fact that the magnetic disk 12 on the turntable 50 is in a state of rotation ready for data transfer with the pair of transducer heads 62 and 64. The output signal of the "ready" sensor circuit 100 goes high upon lapse of a preassigned length of time (e.g. 420 milliseconds) from the beginning of the rotation of the disk drive motor 46 and when its speed of rotation exceeds 90 percent of the normal speed for data transfer.

At 102 is seen a "power on" sensor circuit which is connected both to the first supply terminal 82 and to a second supply terminal 104 of, say, five volts, for sensing the supply of power from these supply terminal. When both supply voltages build up to, say, 70 to 80 percent of the respective normal operating values following the closure of the power switch, the "power on" sensor circuit 102 senses the fact by voltage comparators included therein, whereupon its output goes high. Although not clearly indicated in FIG. 7, the second supply terminal 104 is connected to the head transport motor 74 for applying thereto a smaller voltage (five volts) than that (12 volts) applied by the first supply terminal 82 as required. We will later discuss, in conjunction with the head transport motor control and drive circuit 78, how the head transport motor 74 is fed from both first 82 and second 104 supply terminals.

The reference numeral 106 generally denotes a disk detector for sensing the loading of the magnetic disk cassette 10 on the turntable 50 or into the disk drive 40. The disk detector 106 comprises a light source 108 disposed on one side of the magnetic disk cassette 10 on the turntable 50, a photodetector 110 to be irradiated by the light source, and an amplifier 112 for amplifying the output from the photodetector. The output from the disk detector 106 goes high upon loading of the disk cassette 10 on the turntable 50.

We have named a "motor on" signal supply circuit 114 for the convenience of disclosure; in practice, it may be part of the host equipment controlling the disk drive 40. The "motor on" signal supply circuit 114 supplies a "motor on" signal which goes high for setting the disk drive motor 46 into rotation for data transfer between magnetic disk 12 and transducer heads 62 and 64.

The aforesaid switch control circuit 86 responds to all of the outputs from the "ready" sensor circuit 100, "power on" sensor circuit 102, disk detector 106, and "motor on" signal supply circuit 114 for the on off control of the switching transistor 84. The switch control circuit 86 includes a timer 116 having its input connected to the "power on" sensor circuit 102 and and having its $\overline{Q}$ output connected to a two input AND gate 118. The other input of the AND gate 118 is connected directly to the output of the "power on" sensor circuit 102. The output of the AND gate 118 is connected to a trigger pulse generator 120 and thence to an input of a two input OR gate 122. Connected to the other input of this OR gate 122 is an AND gate 124 having its two inputs connected respectively to the "$\overline{Q}$" output of the timer 116 and to the disk detector 106. The output of the OR gate 122 is connected to a set input S of an RS flip flop 126, the reset input R of which is connected to the "ready" sensor circuit 100. The flip flop 126 has its "Q" output connected to an input of a two input OR gate 128, the other input of which is connected to the "motor on" signal supply circuit 114. The OR gate 128 has its output connected to an input of a two input, open collector NAND gate 130, the other input of which is connected to the disk detector 106. The NAND gate 130 has its output connected to the base of the switching transistor 84 for causing controlled conduction therethrough.

The switch control circuit 86 is constituted of the aforesaid timer 116, AND gate 118, trigger pulse generator 120, OR gate 122, AND gate 124, flip flop 126, OR gate 128, and NAND gate 130.

The circuitry of FIG. 7 further includes a "preready" sensor circuit 132 connected to the output of the shaping circuit 98. The "preready" sensor circuit 132 responds to the shaping circuit output for producing a "preready" signal that goes high at a moment slightly (e.g. 40 milliseconds) before the moment the "ready" signal from the "ready" sensor circuit 100, which also is connected to the output of the shaping circuit 98, goes high. The moment detected by the "preready" sensor circuit 132 is, for example, approximately 380 milliseconds after the moment the disk drive motor 46 is set into rotation. The 40 millisecond period from the moment the "preready" signal goes high to the moment the "ready" signal goes high is required for accurately correcting the angular position of the rotor of the head transport motor 74 preparatory to data transfer in accordance with the novel concepts of our invention. The "preready" sensor circuit 132 has its output connected to the head transport motor control and drive circuit 78 by way of a line 134.

Indicated at 136 in FIG. 7 is a head loading solenoid electrically connected to a head loading signal supply terminal 138 and mechanically acting on the support arm 68 of the upper transducer head 64. When energized by the head loading signal, the solenoid 136 causes the pair of transducer heads 62 and 64 to establish data transfer contact with the magnetic disk 12 of the disk cassette 10 on the turntable 50.

The noted head transport motor control and drive circuit 78 has connected thereto the first supply terminal 82, a stepping (track access) signal supply terminal 140, and a stepping direction signal supply terminal 142 for controlling the head transport motor 74. Further, for the power saving control of the head transport motor 74, the control and drive circuit 78 is connected to the "Q" output of the flip flop 126 by way of a line 144, to the "$\overline{Q}$" and "Q" outputs of the timer 116 by way of lines 146 and 148, and to the head loading signal supply terminal 138, besides being connected to the "preready" sensor circuit 132 by way of the line 134.

Figure 8:
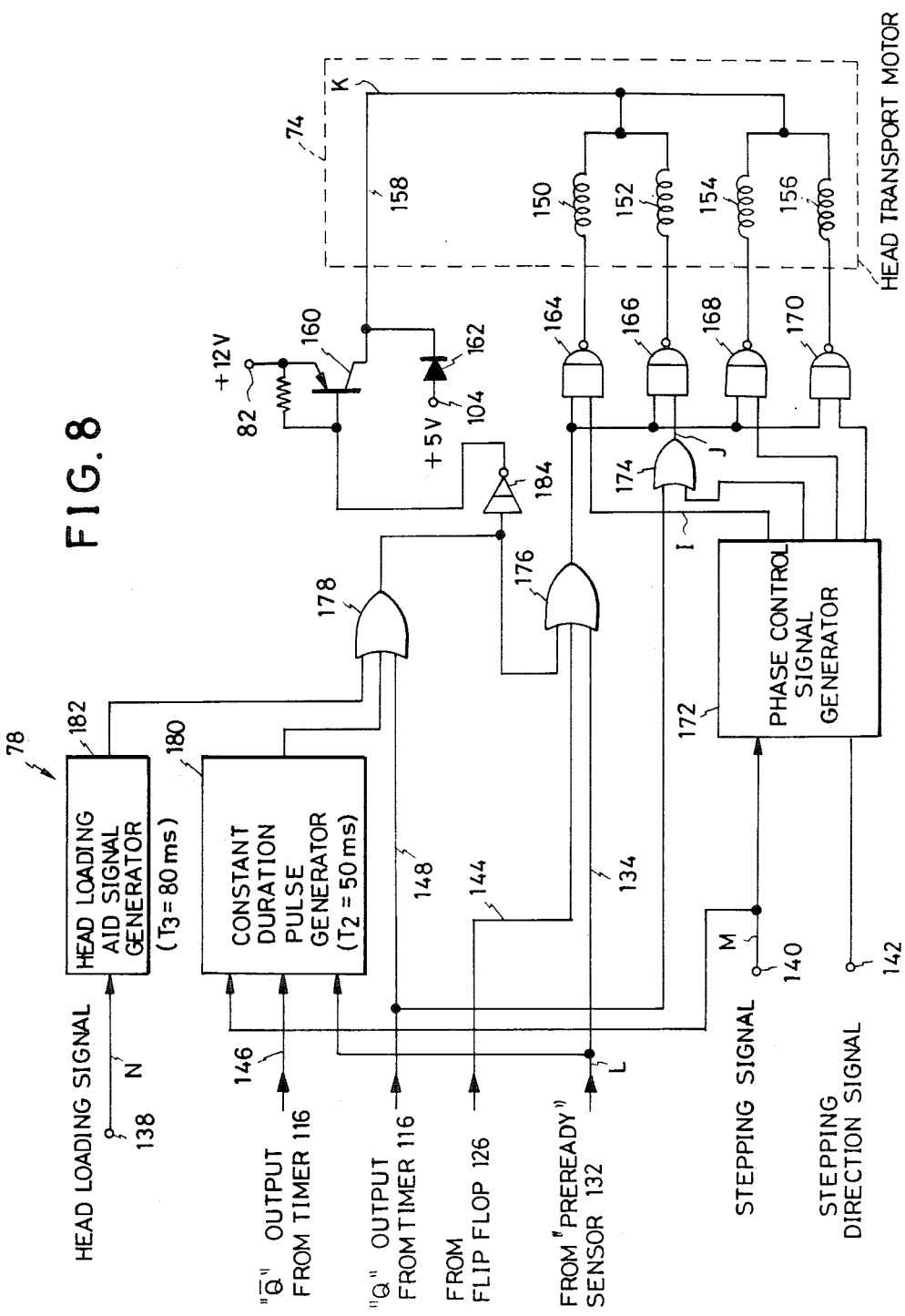
FIG. 8 is a block diagram showing the head transport motor drive and control circuit of FIG. 7 in more detail, together with the windings of the head transport motor and two supply terminals of different voltages for the motor.

We have illustrated the head transport motor control and drive circuit 78 in detail in FIG. 8, together with the windings of the head transport motor 74. As has been stated, the head transport motor 74 is of the four phase construction, comprising first 150, second 152, third 154 and fourth 156 phase windings. All these windings are connected each at one extremity to a common line 158, thereby to be connected to the first supply terminal 82 of 12 volts via a switching transistor 160 and to the second supply terminal 104 of five volts via a diode 162. The other extremities of the head transport motor windings 150, 152, 154 and 156 are connected to the outputs of open collector NAND gates 164, 166, 168 and 170, respectively.

Connected to one of the two inputs of each of the NAND gates 164, 166, 168 and 170 is a phase control signal generator circuit 172 having two inputs connected respectively to the stepping signal supply terminal 140 and to the stepping direction signal supply terminal 142. The phase control signal generator circuit 172 responds in a known manner to the stepping signal and stepping direction signal from the terminals 140 and 142 by delivering corresponding phase control signals to the NAND gates 164, 166, 168 and 170 in order to cause selective energization of the windings 150, 152, 154 and 156 of the head transport motor 74.

The phase control signal generator circuit 172 must control the head transport motor 74 so as to return the pair of transducer heads 62 and 64 to the "track zero" positions on the magnetic disk 12 upon detection of power delivery from the supply terminals 82 and 104 by the "power on" sensor circuit 104. Since the first phase windings 150 of the head transport motor 74 normally correspond to the "track zero" positions, the phase control signal generator circuit applies a first phase control signal to the first phase NAND gate 164, thereby causing energization of the first phase windings 150. The unshown rotor of the head transport motor 74 will then turn, in most cases, to its position opposite the first phase windings 150, with the result that the transducer heads 62 and 64 return to the "track zero" positions on the magnetic disk 12.

However, in four phase stepping motors of single phase drive in general, the rotor becomes locked against displacement when held opposite the third phase windings, if then only the first phase windings are energized. A solution to this problem is to energize not only the first but also the second phase windings. We provide to this end an OR gate 174 through which the phase control signal generator circuit 172 is connected to the second phase NAND gate 166. The OR gate 174 has another input connected to the "Q" output of the timer 116, FIG. 7, by way of the line 148.

The NAND gate 164, 166, 168 and 170 have other inputs connected to a three input OR gate 176 intended for the on off control of the head transport motor 74 even though the latter may be electrically connected to the supply terminal 82 or 104. When the output from this OR gate 176 is high, the output from any of the NAND gates 164, 166, 168 and 170 is high, so that the head transport motor windings 150, 152, 154 and 156 are deenergized regardless of the phase control signals impressed from the phase control circuit 172 to the NAND gates. The three inputs of the OR gate 176 are connected respectively to the "preready" sensor circuit 132 by way of the line 134, to the "Q" output of the flip flop 125 by way of the line 144, and to the output of another three input OR gate 178.

The three inputs of the OR gate 178 are connected respectively to the "Q" output of the timer 116 by way of the line 148, to a constant duration pulse generator circuit 180, and to a head loading aid signal generator circuit 182. The constant duration pulse generator circuit 180 has three inputs connected respectively to the "preready" sensor circuit 132 by way of the line 134, to the "Q" output of the timer 116 by way of the line 146, and to the stepping signal supply terminal 140. Constituted of a retriggerable monostable multivibrator, the constant duration pulse generator circuit 180 puts out a constant duration pulse when any of the input signals goes high. The head loading aid signal generator circuit 182 has its input connected to the head loading signal supply terminal 138. The output from this circuit 182 goes high with the head loading signal and remains so for a preset length of time thereafter. The high level "Q" output from the timer 116, the constant duration pulse generator circuit 180, and the head loading aid signal generator circuit 182 can all pass the OR gate 178.

The OR gate 178 has its output connected not only to the OR gate 176 but also to an open collector NOT circuit 184, which in turn is connected to the base of the PNP switching transistor 160. Thus, as the output from the NOT circuit 184 goes low in response to the high output from the OR gate 178, the switching transistor 160 becomes conductive to allow the head transport motor 74 to be fed from the first supply terminal 82 capable of delivering a 12 volt supply voltage. The second supply terminal 104 of five volts is of course held electrically disconnected from the head transport motor 74 by the diode 162 during the conduction of the switching transistor 160.

Operation

Figure 9:
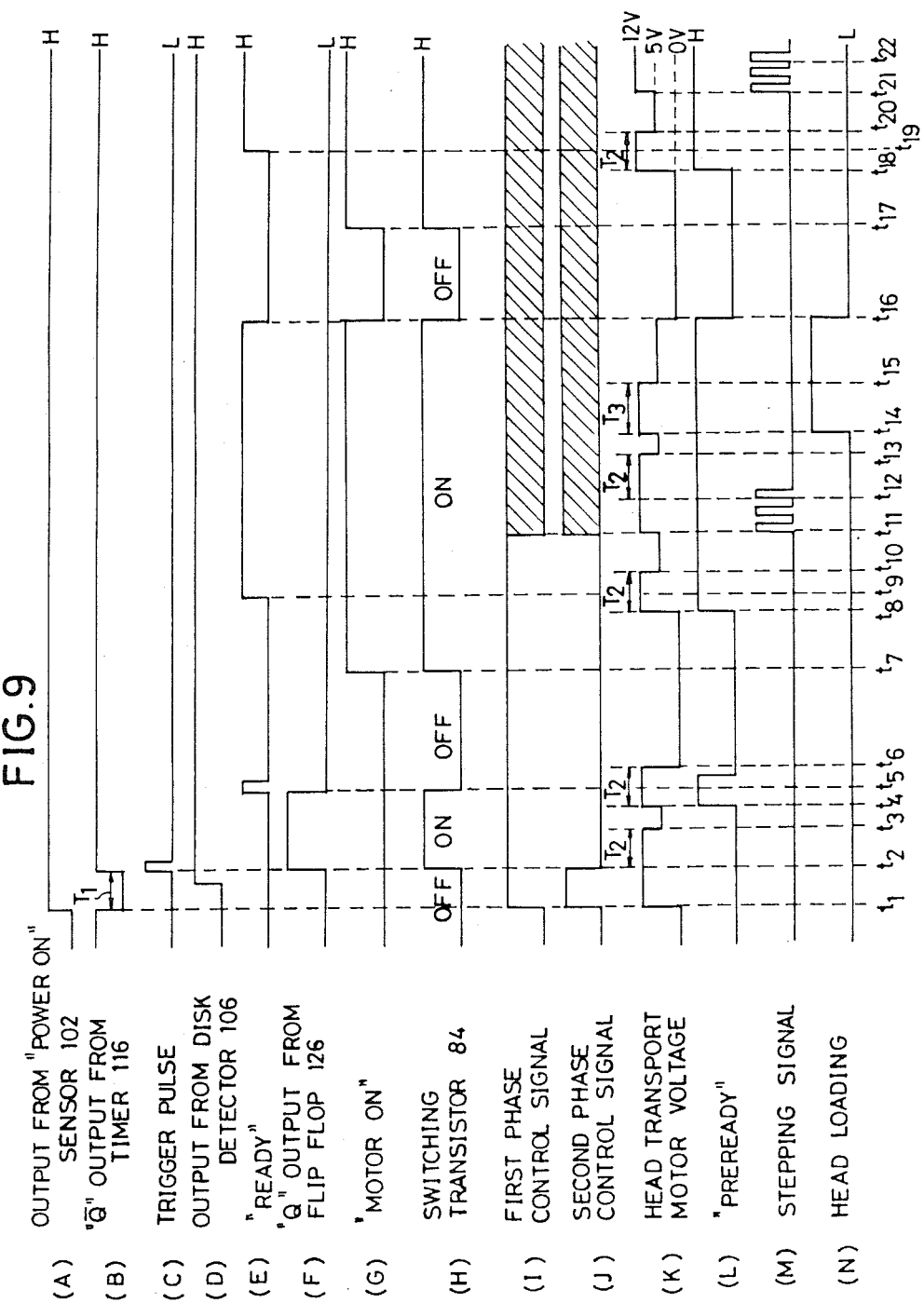
Figure 10:
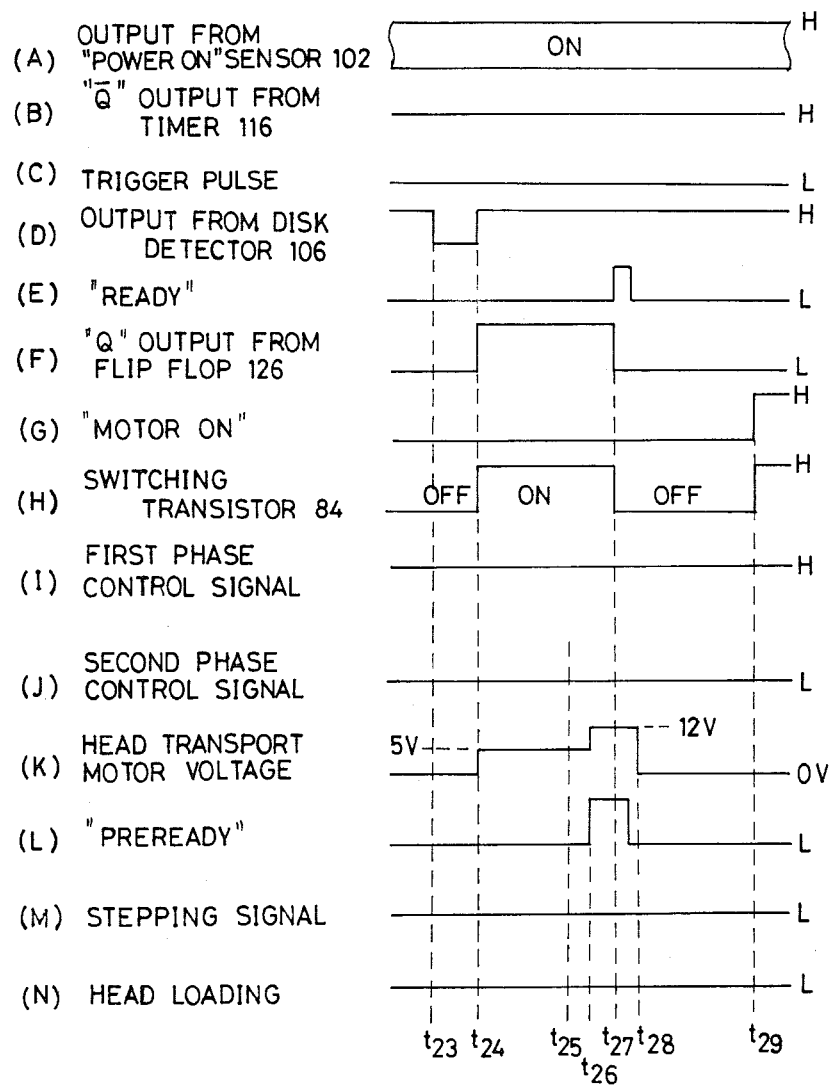

We will now proceed to the operational description of the data transfer apparatus incorporating the circuitry of FIGS. 7 and 8, with reference directed also to the waveform diagrams of FIGS. 9 and 10. We have drawn the waveforms of FIG. 9 on the assumption that the disk cassette 10 has already been loaded into the disk drive 40 when the power switch is closed, and the waveforms of FIG. 10 on the assumption that the disk cassette is reloaded into the disk drive with the power switch held closed. Further, to facilitate understanding, we have indicated in FIGS. 7 and 8 the lines on which the waveforms (A) through (N) of FIGS. 9 and 10 appear, by the same capitals.

Let us first suppose that the data transfer apparatus is powered on after the disk cassette 10 has been placed on the turntable 50, with the spindle 48 received in the center hole 36 in the disk hub 34 but with the drive pin 52 out of engagement in the eccentric slot 38 in the disk hub. As the output from the "power on" sensor circuit 102 goes high (H) at a moment t1 in time as at (A) in FIG. 9, the output from the timer 116, which is normally high, goes low (L) and remains low for a preassigned length of time T1 (e.g. 12 milliseconds) until a moment t2 as at (B) in FIG. 9. This low level period of the timer output is necessary for positively returning the pair of transducer heads 62 and 64 to the "track zero" positions on the magnetic disk 12 through the noted multiphase energization of the four phase, single phase drive, head transport motor 74.

The output from the "power on" sensor circuit 102 and the "Q" output from the timer 116 are both directed into the AND gate 118. As will be seen from a consideration of (A) and (B) in FIG. 9, the AND gate 118 allows the passage of the high level output from the "power on" sensor circuit 102 only after the moment t2 when the output from the timer 116 goes high.

As the output from the AND gate 118 goes high at the moment t2 as above, the trigger pulse generator 120 responds by putting out a trigger pulse as at (C) in FIG. 9, for delivery to the OR gate 122. This OR gate also receives the output from the AND gate 124.

If the disk cassette 10 has already been loaded on the turntable 50 when the power switch is closed, as we have assumed above, then the output from the disk detector 106 goes high shortly after the moment t1 and before the moment t2, as at (D) in FIG. 9. This disk detector output is directed into the AND gate 124, which also directly receives the "$\overline{Q}$" output from the timer 116, which output remains low from moment t1 to moment t2 as aforesaid. Consequently, the output from the AND gate 124 does not go high in direct response to the high output from the disk detector 106 but does so only at the moment t2 when the "$\overline{Q}$" output from the timer 110 goes high.

The flip flop 126 is therefore set at the moment t2, as at (F) in FIG. 9, by the output from the OR gate 122. The resulting high output from the flip flop 126 is fed to the OR gate 128, which is also supplied with the "motor on" signal from the "motor on" signal supply circuit 114. As indicated at (G) in FIG. 9, the "motor on" signal still remains low, so that the high output from the flip flop 126 passes the OR gate 128 on to the NAND gate 130. This NAND gate also receives the output from the disk detector 106. Accordingly, only when the output from the disk detector 106 is high, the output from the NAND gate 130 goes low in response to the high output from the OR gate 128. Since the output from the disk detector 106 has already gone high, as we have mentioned in connection with (D) in FIG. 9, the NAND gate 130 actuates the switching transistor 84 to cause conduction therethrough at the moment t2 as at (H) in FIG. 9.

Powered from the first supply terminal 82 via the switching transistor 84, the motor drive circuit 80 starts energizing the disk drive motor 46. The turntable 50 rotates with the disk drive motor 46 relative to the magnetic disk 12 of the disk cassette 10 on the turntable. The LED 90 of the revolution sensor 88 is also powered from the first supply terminal 82 via the switching transistor 84, so that the revolution sensor starts sensing the revolution of the disk drive motor 46 at the moment t2. The drive pin 52 on the turntable 50 will certainly become engaged in the eccentric slot 38 in the disk hub 34 by the time the output from the "ready" sensor circuit 100 goes high at a moment t5 as at (E) in FIG. 9. The high output from the "ready" sensor circuit 100 resets the flip flop 126 as at (F) in FIG. 9, with the result that the NAND gate 130 terminates conduction through the switching transistor 84. Thus the disk drive motor 46 is set out of rotation, and the LED 90 of the revolution sensor 88 is also deenergized, for saving power.

The "motor on" signal from the "motor on" signal supply circuit 114 is shown to go high at a moment t7 at (G) in FIG. 9. The "motor on" signal passes the OR gate 128 on to the NAND gate 130. The output from the disk detector 106, also fed to the NAND gate 130, is still high, as at (D) in FIG. 9, so that the NAND gate again causes conduction through the switching transistor 84, as at (H) in FIG. 9. Thereupon the disk drive motor 46 is set into rotation, and the LED 90 of the revolution sensor 88 is also energized.

Since the turntable 50 with its drive pin 52 has already established proper driving engagement with the magnetic disk 12 during the period from moment t2 to moment t5, the disk will be immediately set into rotation upon energization of the disk drive motor 46. Data transfer between magnetic disk 12 and transducer heads 62 and 64 is initiated as the output from the "ready" sensor circuit 100 goes high at a moment t9. Although this high output from the "ready" sensor circuit 100 enters the reset input R of the flip flop 126, the NAND gate 130 continues actuating the switching transistor 84 since the "motor on" signal remains high as at (G) in FIG. 9. The switching transistor 84 is shown deactuated to set the disk drive motor 46 out of rotation at a moment t16, as at (H) in FIG. 9, when the "motor on" signal goes low as at (G) in FIG. 9. The switching transistor reconducts when the "motor on" signal goes high at a subsequent moment t17.

We will now explain the operation of the data transfer apparatus when the disk cassette 10 is loaded therein after the power switch is closed. In FIG. 10, therefore, power is held supplied as at (A), the "Q" output from the timer 116 has already gone high as at (B), and the output from the trigger pulse generator 120 has already become low as at (C). As will be seen from (D) in FIG. 10, the disk cassette 10 has been unloaded from the disk drive 40 since moment t23. Upon loading of the disk cassette 10, the output from the disk detector 106 goes high at a moment t24, as at (D) in FIG. 10. Since the output from the timer 116 is already high, the high output from the disk detector 106 immediately sets the flip flop 126 as at (F) in FIG. 10. The resulting high output from the flip flop 126 is directed via the OR gate 128 to the NAND gate 130. Receiving the high outputs from both disk detector 106 and flip flop 126, the NAND gate 130 causes conduction through the switching transistor 84, thereby allowing the same to conduct power from the first supply terminal 82 on to the disk drive motor 46 and the LED 90. The turntable 50 revolves with the disk drive motor 46 for the establishment of driving engagement of the drive pin 52 in the eccentric slot 38 in the magnetic disk 12.

As the "ready" sensor circuit 100 puts out a "ready" pulse at a subsequent moment t27, as at (E) in FIG. 10, the flip flop 126 is thereby reset as at (F) in FIG. 10. Then the switching transistor 84 is deactuated as at (H) in FIG. 10 to suspend the energization of the disk drive motor 46 and the LED 90, thereby saving power.

The "motor on" signal is shown to go high at a subsequent moment t29, as at (G) in FIG. 10, with the result that the switching transistor 84 again becomes conductive as at (H) in FIG. 10. Since the turntable 50 is already in proper driving engagement with the magnetic disk 12, the latter will quickly attain a rotative speed required for data transfer. Data transfer will be initiated as the output from the "ready" sensor circuit 100 subsequently goes high and will be terminated when the "motor on" signal goes low, or when the disk cassette 10 is unloaded from the disk drive 40.

The foregoing description of operation has been directed primarily to the switching control circuit 86, FIG. 7, making on off control of the switching transistor 84 for automatically energizing the disk drive motor 46 from the first supply terminal 82 as required. We will now proceed to the operational description of the head transport motor control and drive circuit 78, shown in detail in FIG. 8, for the controlled energization of the head transport motor 74 in accordance with the novel concepts of our invention.

As has been mentioned, the output from the "preready" sensor circuit 132, FIG. 7, goes high approximately 40 milliseconds before the output from the "ready" sensor circuit 100 goes high, and approximately 380 milliseconds after the disk drive motor 46 is set into rotation. Thus, as indicated at (L) in FIGS. 9 and 10, the "preready" signal is shown to go high at moments t4, t8, t18 and t26 which precede the moments t5, t9, t19 and t27 when the "ready" signal goes high as at (E) in FIGS. 9 and 10.

We have also stated in connection with FIG. 8 that the phase control signal generator circuit 172, included in the head transport motor control and drive circuit 78, causes energization of the first phase windings 150 of the head transport motor 74 via the first phase NAND gate 164 upon detection of power delivery from the supply terminals 82 and 104 by the "power on" sensor circuit 102. Thus, as indicated at (I) in FIG. 9, the first phase control signal goes high at the moment t1. Further, as the second phase NAND gate 166 is connected to the "Q" output of the timer 116 via the OR gate 174, the second phase windings 152 of the head transport motor 74 are energized during the period from moment t1 to moment t2, as at (J) in FIG. 9, when the "Q" output from the timer 116 is high. With both first 150 and second 152 phase windings of the head transport motor 74 thus energized from moment t1 to moment t2, the unshown rotor of the motor can be positively returned to the position opposite the first phase windings 150, with the result that the pair of transducer heads 62 and 64 return to the "track zero" positions on the magnetic disk 12.

Incidentally, if the transducer heads 62 and 64 are considerably distanced from the "track zero" positions, a stepping signal may be fed from the terminal 140 to the phase control signal generator circuit 172 for returning the heads to the "track zero" positions. The first phase windings 150 may be energized following the return of the transducer heads 62 and 64 to the "track zero" positions.

The constant duration pulse generator circuit 180 puts out a pulse of a predetermined duration T2 (e.g. 50 milliseconds) when any of the three input signals goes high. Thus, in this embodiment, the constant duration pulse generator circuit 180 produces a pulse of the duration T2 at the moment t2 when the "$\overline{Q}$" ouitput from the timer 116 goes high as at (B) in FIG. 9, at the moments t4, t8 and t18 when the "preready" signal from the sensor circuit 132 goes high as at (L) in FIG. 9, and at the moments t12 and t22 when the last of a consecutive series of stepping pulses is fed from the supply terminal 140 as at (M) in FIG. 9. Being in the form of a retriggerable monostable multivibrator as aforesaid, the constant duration pulse generator circuit 180 is retriggered by each of an incoming series of stepping pulses having spacings less than the period T2. The output from the circuit 180 remains high during such retriggering, as from moment t11 to moment t12 in FIG. 9, and goes low 50 milliseconds after having been retriggered by the last of the series of stepping pulses.

The head loading aid signal generator circuit 182 puts out a pulse of a predetermined duration T3 (e.g. 80 milliseconds) in response to the leading edge of the head loading pulse fed from the terminal 138, as at moment t14 in FIG. 9.

Connected to the "Q" output of the timer 116 and the outputs of the constant duration pulse generator circuit 180 and the head loading aid signal generator circuit 182, the OR gate 178 serves to determine the periods of time during which a 12 volt supply voltage is impressed from the first supply terminal 82 to the head transport motor 74. Being connected to the output of the OR gate 178 via the NOT circuit 184, the switching transistor 160 conducts in response to the high output from the OR gate 178, delivering the 12 volt supply voltage from first supply terminal 82 to the head transport motor 74. As will be seen by referring to (K) in FIGS. 9 and 10, the head transport motor 74 is fed with the 12 volt supply voltage from the first supply terminal 82 during the following periods:

1. From moment t1 to moment t2 when the "Q" output from the timer 116 remains high for the period T1 (12 milliseconds).

2. From moment t2 to moment t3 when the output from the constant duration pulse generator circuit 180 remains high for the period T2 (50 milliseconds) in response to the "$\overline{Q}$" output from the timer 116.

3. From moment t4 to moment t6, from moment t8 to moment t10, from moment t18 to moment t20, and from moment t26 to moment t28, when the output from the constant duration pulse generator circuit 180 remains high for the period T2 in response to the high states, starting at the moments t4, t8, t18 and t26 as at (L) in FIGS. 9 and 10, of the output from the "preready" sensor circuit 132. (The noted high states of the "preready" sensor circuit output are due to the closure of the power switch, to the high states of the "motor on" signal, and to the loading of the disk cassette 10, respectively.)

4. From moment t11 to moment t12, and from moment t21 to moment t22, when the constant duration pulse generator circuit 180 is retriggered by the two consecutive series of stepping pulses, seen at (M) in FIG. 9, from the terminal 140.

5. From moment t12 to moment t13 when the output from the constant duration pulse generator circuit 180 remains high for the period T2 by being retriggered by the last of the first series of stepping pulses.

6. From moment t14 to moment t15 when the output from the head loading aid signal generator circuit 182 remains high for the period T3 (80 milliseconds) in response to the high state (from moment t14 to moment t16) of the head loading signal, seen at (N) in FIG. 9, from the terminal 138.

The diode 162 is reverse biased during the above periods, holding the second supply terminal 104 electrically disconnected from the head transport motor 74. Further, since the output of the OR gate 178 is connected to the OR gate 176, the output from the latter is high during all the above periods. Impressed to the NAND gates 164, 166, 168 and 170, the high output from the OR gate 176 allows the phase control signal generator circuit 172 to cause energization of any of the head transport motor windings 150, 152, 154 and 156 from the first supply terminal 82.

During other than the above enumerated periods, as will be understood from (K) in FIGS. 9 and 10, the head transport motor 74 is either fed from the second supply terminal 104 with the five volt supply voltage or supplied with substantially no voltage or current as the outputs from all the NAND gates 164, 166, 168 and 170 go high (12 volts) in response to the low output from the OR gate 176.

As we have stated in connection with FIG. 10, the disk drive motor 46 is set into rotation immediately upon loading of the disk cassette 10 in the disk drive 40, as at the moment t24, if then the power switch of the data transfer apparatus has already been closed. As the "preready" signal subsequently goes high at the moment t26, as at (L) in FIG. 10, the head transport motor 74 is fed with the 12 volt supply voltage from the first supply terminal 82, as at (K) in FIG. 10. In short, upon loading of the disk cassette 10 in the disk drive 40, the head transport motor 74 is fed with the 12 volt supply voltage for the prescribed length of time thereafter. No voltage is supplied to the head transport motor 74 when the disk cassette is unloaded from the disk drive 40, as from moment t23 to moment t24 in FIG. 10.

The selective energization of the windings 150, 152, 154 and 156 of the head transport motor 74 from the phase control signal generator circuit 172 is possible only when either of the three input signals to the OR gate 176 is high. No voltage or current is supplied to the head transport motor 74 when all the inputs to the OR gate 176 are low, as from moment t6 to moment t8 and from moment t16 to moment t17 at (K) in FIG. 9. The moment t6 is approximately the same as the moment the switching transistor 84 becomes nonconductive following the establishment of the driving engagement of the turntable 50 with the magnetic disk 12, as at (H) in FIG. 9, whereas the moment t8 is when the "preready" signal goes high as a result of the rotation of the disk drive motor 46 in response to first high state of the "motor on" signal. The moment t16 is when the switching transistor 84 becomes nonconductive in response to the going low of the "motor on" signal, whereas the moment t18 is when the "preready" signal goes high as a result of the rotation of the disk drive motor 46 in response to the second high state of the "motor on" signal.

The head transport motor 74 is fed from the second supply terminal 104 when the output from the OR gate 178 is low whereas the output from the OR gate 176 is high. Thus, as indicated at (K) in FIGS. 9 and 10, the head transport motor 74 is supplied with five volts from moment t3 to moment t4, from moment t10 to moment t11, from moment t13 to moment t14, from moment t15 to moment t16, from moment t20 to moment t21, and from moment t24 to moment t26.

As is evident from the foregoing disclosure, we have gained the following advantages by this particular embodiment of our invention:

1. A remarkable saving of power is realized as no voltage is impressed to the heat transport motor 74 approximately, not exactly, when the disk drive motor 46 is disconnected from the first supply terminal 82 by the switching transistor 84, as from moment t6 to moment t8 and from moment t16 to moment t18 in FIG. 9 and before the moment t24 and after the moment t28 in FIG. 10.

2. Even though no voltage is applied to the head transport motor 74 as from moment t6 to moment t8 and from moment t16 to moment t18 as above, a high or normal voltage (12 volts) is impressed thereto for the prescribed period of time T2 (50 milliseconds) following the moments t8 and t18 when the "preready" signal goes high as at (L) in FIG. 9. The rotor of the head transport motor 74, and therefore the pair of transducer heads 62 and 64, can be accurately positioned before the following moments t9 and t19 when the "ready" signal goes high as at (E) in FIG. 9, thereby making it possible for the transducer heads 62 and 64 to exactly access the desired tracks on the magnetic disk 12 upon subsequent commencement of data transfer.

3. The 12 volt supply voltage is impressed to the head transport motor 74 not at the moments t7 and t17 when the "motor on" signal for the disk drive motor 46 goes high as at (G) in FIG. 9, but at the later moments t8 and t18 when the "preready" signal goes high as at (L) in FIG. 9. The simultaneous flow of starting currents to the two motors 46 and 74 is thus avoided to make possible the use of a supply circuit of a correspondingly smaller capacity.

4. No voltage is impressed to the head transport motor 74 at least from moment t23 to moment t24, FIG. 10, during which period the disk cassette 10 is unloaded from the disk drive 40. Then, upon reloading of the disk cassette 10, the five volt supply voltage is applied to the head transport motor 74 at the moment t24, as at (K) in FIG. 10, and the disk drive motor 46 is set into rotation at the same moment as at (H) in FIG. 10. Thereafter, as the "preready" signal goes high at the moment t26, the 12 volt supply voltage is impressed to the head transport motor 74 for the predetermined period of time T2 (50 milliseconds). This manner of high voltage application to the head transport motor 74 results in the automatic recorrection of the possible angular displacement of the rotor of the head transport motor due to vibrations or shocks caused by the unloading and reloading of the disk cassette 10, as well as to vibrations that may be generated when the disk drive motor 46 is set into and out of rotation. As an additional advantage, even if the "motor on" signal goes high earlier than the moment t29 and, in consequence, if data transfer is initiated immediately after the moment t27 when the "ready" signal goes high as at (E) in FIG. 10, the transducer heads 62 and 64 will access the exact tracks dictated by the signals from the host equipment.

5. The 12 volt supply voltage is impressed to the head transport motor 74 for the predetermined period of time T2 in response to the last of each consecutive series of stepping pulses, as will be understood from (K) and (M) in FIG. 9, so that the transducer heads 62 and 64 can be positively held in the last dictated track positions.

6. The 12 volt supply voltage is also impressed to the head transport motor 74 for the prescribed period of time T3 (80 milliseconds) in response to the head loading signal from the terminal 138, as will be seen from (K) and (N) in FIG. 9, thereby avoiding the possible displacement of the transducer heads 62 and 64 at the time of head loading.

7. The driving engagement of the turntable 50 with the magnetic disk 12 is established automatically as the disk cassette 10 is loaded on the turntable, either before or after the apparatus is electrically turned on, so that data transfer between disk and heads starts faster in response to the "motor on" signal than heretofore.

8. The energization of the disk drive motor 46 for the attainment of the driving engagement of the turntable 50 with the magnetic disk 12 is suspended automatically, rather than continued until the "motor on" signal goes high, in response to the "ready" sensor output signal for saving power.

9. The LED 90 of the revolution sensor 88 is also energized and deenergized together with the disk drive motor 46 to further enhance the power saving capability of the apparatus.

10. The simultaneous flow of starting current to both disk drive motor 46 and head transport motor 74 upon closure of the power switch is avoided as the timer 116 introduces a delay in setting the flip flop 126 in response to the output from the "power on" sensor circuit 102, making it possible to correspondingly reduce the capacity of the supply circuit connected to the supply terminal 82.

Second Form

Figure 11:
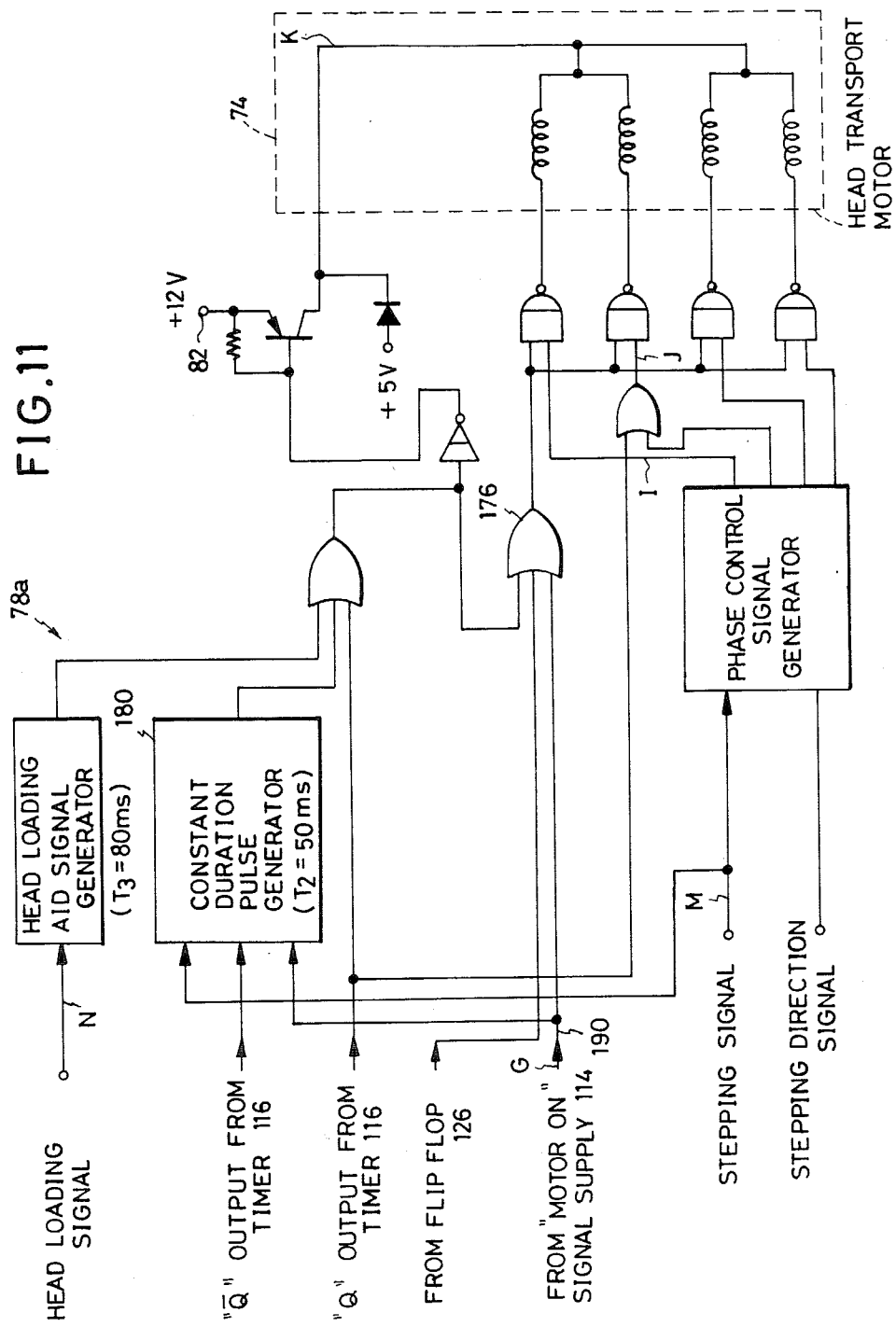
FIG. 11 is a block similar to FIG. 8 but showing an alternative form of the head transport motor control and drive circuit in accordance with our invention.

FIG. 11 illustrates an alternative form of the head transport motor control and drive circuit. Generally designated 78a, the alternative control and drive circuit differs from the FIG. 8 circuit 78 in connecting an output line 190 of the "motor on" signal supply circuit 114 to both OR gate 176 and constant duration pulse generator circuit 180, instead of connecting the output line 134 of the "preready" sensor circuit 132 to gate 176 and circuit 180. The other details of construction of the alternative control and drive circuit 78a can be as set forth above in connection with the FIG. 8 circuit 78.

Figure 12:
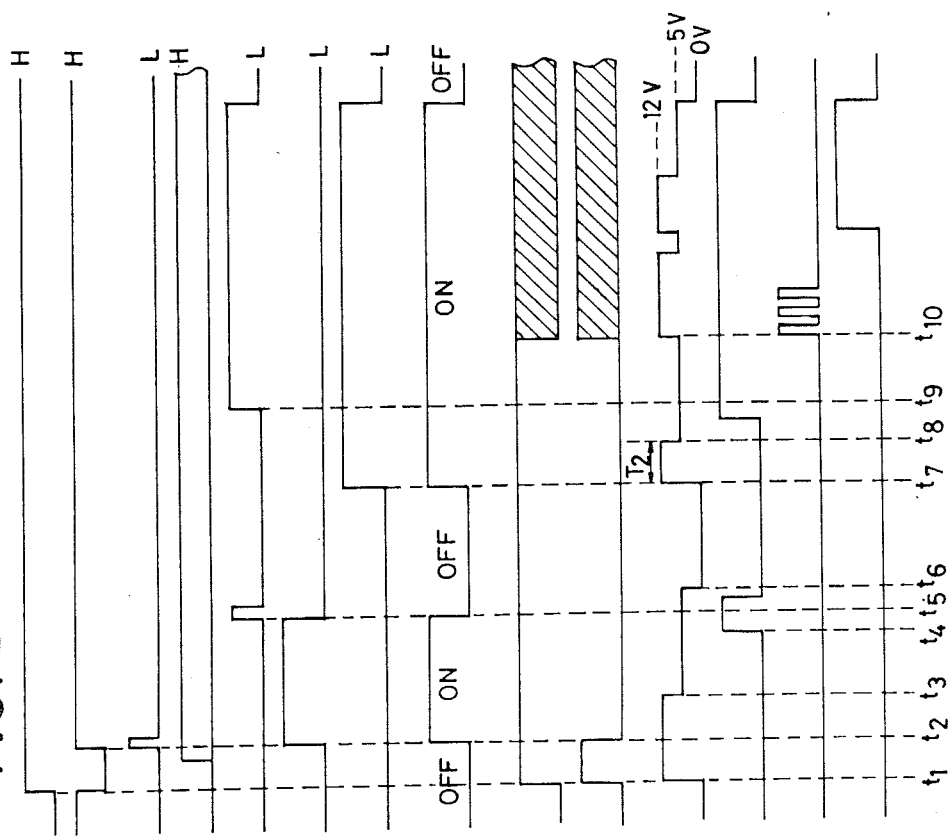
FIG. 12, consisting of (A)–(N), is a series of waveform diagrams similar to FIG. 9 but explanatory of the operation of the data transfer apparatus incorporating the alternative head transport motor control and drive circuit of FIG. 11.

We have illustrated in FIG. 12 a series of waveform diagrams largely similar to those of FIG. 9 but explanatory of the operation of the data transfer apparatus incorporating the modified head transport motor control and drive circuit 78a of FIG. 11. When the "motor on" signal goes high at a moment t7 as at (G) in FIG. 12, the constant duration pulse generator circuit 180 responds by putting out a pulse of the duration T2 (50 milliseconds). Consequently, through the procedure set forth with reference to FIG. 8, the 12 volt supply voltage is impressed from the first supply terminal 82 to the head transport motor 74 during the subsequent period of the moments t7 through t8. The high supply voltage applied to the head transport motor 74 at the moment t7 is effective to correct the possible displacement of its rotor during the peeriod of the moments t6 through t7 when the supply voltage to the head transport motor has been zero.

It will be observed from (E) and (K) in FIG. 12 that the application of the 12 volt supply voltage to the head transport motor 74 at the moment t7 is discontinued at the following moment t8, before the "ready" signal goes high at the moment t9, in this particular embodiment. As desired, however, the application of the 12 volt supply voltage to the head transport motor 74 may be continued until the moment t9.

Third Form

Figure 13:
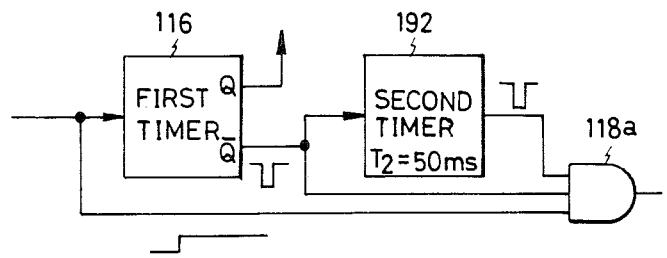
FIG. 13 is a partial block diagram of a slight modification of the circuitry of FIG. 7.

In FIG. 13 is shown a slight modification of the FIG. 7 embodiment, additionally comprising a second timer 192 connected between the "$\bar{Q}$" output of the first recited timer 116 and a three input AND gate 118a. The other two inputs of the AND gate 118a are connected directly to the "power on" sensor circuit 102, not shown in this figure, and to the "$\bar{Q}$" output of the first timer 116, respectively. The other details of construction can be as set forth above in connection with FIG. 7.

Figure 14:
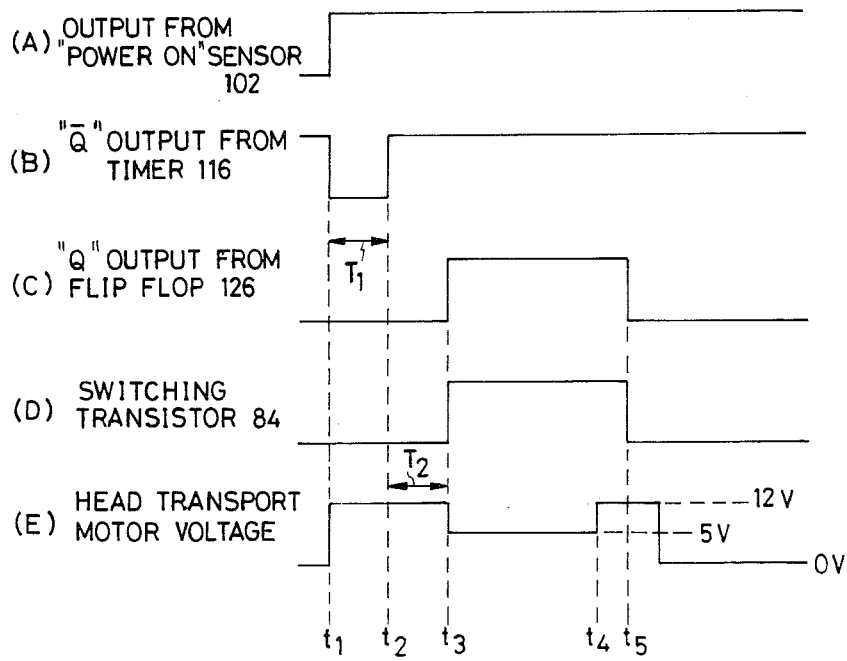
FIG. 14, consisting of (A)–(E), is a series of waveform diagrams explanatory of the operation of the data transfer apparatus incorporating the modified circuitry of FIG. 13.

Triggered by the trailing edge of the negative pulse from the "$\bar{Q}$" output of the first timer 116, the second timer 192 puts out a negative pulse of the duration T2 (50 milliseconds or more), for delivery to the AND gate 118a. The two consecutive timers 116 and 192 function in combination to delay the output from the "power on" sensor circuit 102 by (T1+T2). Consequently, as will be seen from (C) and (D) in the waveform diagrams of FIG. 14, the flip flop 126 is set, and the switching transistor 84 conducts, at the moment t3 at the earliest, which is later than the moment t2 by T2. The 12 volt supply voltage is impressed to the head transport motor 74 from moment t1 to moment t3, as in the foregoing two embodiments, so that the disk drive motor 46 is set into rotation after this period to make possible a reduction in supply capacity.

The objective of the FIG. 13 embodiment is attainable by means other than the second timer 192. An example is to trigger the flip flop 126, FIG. 7, by the pulse generated by the constant duration pulse generator circuit 180, FIG. 8, in response to the output from the timer 116.

Possible Modifications

We wish to have it understood that the above detailed disclosure is meant purely to illustrate or explain and not to impose limitations upon our invention, since a variety of modifications will readily occur to one skilled in the art on the basis of this disclosure, without departing from the broader scope to which out invention is entitled. The following, then, is a brief list of such possible modifications:

1. The supply voltage for the head transport motor 74 could not necessarily be zero during the periods of the moments t6 through t8 and the moments t16 through t18 but could be set at any value less than the predetermined high voltage (12 volts in the illustrated embodiments).

2. The "preready" signal could be derived not from the output from the revolution sensor 88 but by, for example, providing a timer that puts out a pulse with a predetermined duration of, say, 380 milliseconds in response to the leading edge of each output pulse of the OR gate 128, with the trailing edge of the timer output pulse representing the "preready" moment.

3. The head transport motor 74 could be electrically disconnected from the power supplies by a switching transistor connected to the supply line 158, FIG. 8, instead of by the OR gate 76 and NAND gates 164, 166, 168 and 170.

4. The constant duration pulse generator circuit (retriggerable monostable multivibrator) 180 might be triggered by the trailing edges of stepping pulses, rather than by their leading edges as in the illustrated embodiments.

5. The supply voltage for the head transport motor 74 during the production of the stepping pulses, as from moment t11 to moment t12 in FIG. 9, could be different from that during the production of the pulses from the constant duration pulse generator circuit 180, it being only required that the high supply voltage during pulse production from the generator circuit 180 be sufficient to recorrect the angular position of the rotor of head transport motor 74.

6. The high supply voltage might be impressed to the head transport motor 74 immediately upon loading of the disk cassette on the turntable 50, that is, from the moment t24 in FIG. 10.

7. The revolution sensor 88 could be composed of a permanent magnet affixed to the rotor 94 of the disk drive motor 46, and a fixed magnetoelectric converter such as a Hall effect device acted upon by the magnet, preferably with the magnetoelectric converter electrically turned on and off by the switching transistor 84 or by equivalent means.

8. The resetting of the flip flop 126 by the output from the "ready" sensor circuit 100 is not essential; instead, a timer may be provided which resets the flip flop upon lapse of a predetermined length of time (e.g. 420 milliseconds) after the flip flop has been set, provided that the magnetic disk 12 is then in rotation at not less than 90 percent of its normal speed.

9. The output from the "power on" sensor circuit 102 need not be delayed for the period T1 by the timer 116 if the power supply in use is of large capacity, or if the energization of the head transport motor 74 is unnecessary when the apparatus is electrically turned on; in that case, the flip flop 126 will be set immediately upon closure of the power switch.

10. The rotation of the head transport motor 74 could be translated into the linear motion of the carriage 66 by means other than the lead screw 76, such as a steel belt bent into the shape of the Greek alpha or a rack and pinion mechanism.

11. The pair of transducer head 62 and 64 might be constantly held in contact with the magnetic disk 12, even when being fed radially of the disk.

12. The data storage medium for use in the practice of our invention may be other than the disk cassette 10 of FIGS. 1 through 3, an example being flexible magnetic disk cartridge disclosed in Castrodale et al. U.S. Pat. No. 4,089,029.

We claim:

1. A data transfer apparatus for use with a replaceable disk like record medium such as a flexible magnetic disk having data storage tracks thereon, comprising:
   (a) a disk drive motor for imparting rotation to the record medium;
   (b) disk drive motor control means for setting the disk drive motor into and out of rotation;
   (c) a revolution sensor for sensing the speed of rotation of the disk drive motor;
   (d) a transducer head for data transfer with the record medium;
   (e) means for supplying a stepping signal;
   (f) a head transport motor responsive to the stepping signals for transporting the transducer head radially of the medium so as to enable the transducer head to access the individual data store tracks thereon;
   (g) a "ready" sensor circuit coupled to the revolution sensor for determining the moment the disk drive motor reaches a first prescribed speed at which the record medium is ready for the commencement of data transfer with the transducer head;
   (h) a "preready" sensor circuit coupled to the revolution sensor for determining the moment the disk drive motor reaches a second prescribed speed less than the first prescribed speed, the "preready" sensor circuit producing an output which is in a first state when the rotational speed of the disk drive motor is less than the second prescribed speed, and which is in a second state when the rotational speed of the disk drive motor is more than the second prescribed speed;
   (i) a constant duration pulse generator circuit coupled both to the stepping signal supply means and to the "preready" sensor circuit for producing a constant duration pulse in response both to the stepping signal and to a change from the first to the second state of the output from the "preready" sensor circuit;
   (j) voltage supply means coupled to the head transport motor for supplying a first supply voltage sufficiently high for the head transport motor to transport the transducer head and to correct its track position on the record medium, and a second supply voltage which is less than the first supply voltage;
   (k) circuit means coupled both to the constant duration pulse generator circuit and to the voltage supply means for causing the latter to impress the first supply voltage to the head transport motor in response to each constant duration pulse; and
   (l) circuit means coupled both to the "preready" sensor circuit and to the voltage supply means for causing the latter to impress the second supply voltage to the head transport motor in response to the first state of the output from the "preready" sensor circuit.

2. A data transfer apparatus as set forth in claim 1, wherein the second supply voltage is zero.

3. A method of operation for a data transfer apparatus for use with a replaceable disklike record medium such as a flexible magnetic disk having data storage tracks thereon, with said data transfer apparatus including a disk drive motor for imparting rotation to the record medium, a transducer head for data transfer with the record meadium, and a head transport motor for transporting said transducer head radially of the record medium in response to a stepping signal so as to enable the transducer head to access individual data storage tracks on the record medium for data transfer therewith, which method comprises:
   (a) setting the disk drive motor into rotation for driving the record medium;
   (b) sensing a "ready" moment when the disk drive motor reaches a first prescribed speed at which the record medium is ready for commencing data transfer with the transducer head;
   (c) determining a "preready" moment, immediately before the "ready" moment, at which the disk drive motor reaches a second prescribed speed less than the first prescribed speed;
   (d) rotating the head transport motor in response to the stepping signal for transporting the transducer head from track to track on the record medium;
   (e) impressing a first supply voltage to the head transport motor at least for a prescribed length of time following the "preready" moment and during the period when the head transport motor is in rotation, the first supply voltage being sufficiently high for the head transport motor to transport the transducer head and to correct its track position on the record medium; and
   (f) impressing a second supply voltage, lower than the first supply voltage, to the head transport motor at least during at least part of the period from the moment the disk drive motor is set out of rotation to the subsequent "preready" moment.

4. A method of operation for a data transfer apparatus as set forth in claim 3, wherein the second supply voltage is zero.

5. A method of operation for a data transfer apparatus with a replaceable disklike record medium such as a flexible magnetic disk having data storage tracks thereon, with the data transfer apparatus including a disk drive motor for imparting rotation to the record medium, a transducer head to be loaded into, and loaded out of, contact with the record medium, and a head transport motor for transporting a transducer head radially on the record medium in response to series of stepping pulses so as to enable the transducer head to access individual data storage tracks on the record medium for data transfer therewith, which method comprises:
   (a) sensing that the data transfer apparatus is electrically on;
   (b) impressing a first supply voltage, sufficiently high to correct the position of the transducer head on the record medium, to the head transport motor at least for a prescribed period of time following the moment the data transfer apparatus is sensed to be electrically turned on;
   (c) setting the disk drive motor into rotation for driving the record medium;
   (d) sensing a "ready" moment when the disk drive motor reaches a first prescribed speed at which the record medium is ready for commencing data transfer with the transducer head;

(e) determining a "preready" moment, immediately before the "ready" moment, at which the disk drive motor reaches a second prescribed speed less than the first prescribed speed;

(f) again impressing the first supply voltage to the head transport motor for a prescribed length of time following the "preready" moment;

(g) sensing the delivery of the series of stepping pulses to the head transport motor;

(h) again impressing the first supply voltage to the head transport motor during the period when each series of stepping pulses are being supplied for stepping the head transport motor, the first supply voltage being sufficiently high for the head transport motor to transport the transducer head;

(i) further impressing the first supply voltage for a prescribed length of time following the moment the last of each series of stepping pulses is generated;

(j) sensing the loading of the transducer head against the record medium;

(k) again impressing the first supply voltage to the head transport motor for a prescribed length of time following the moment the transducer head becomes loaded against the record medium; and (l) impressing a second supply voltage, lower than the first supply voltage, to the head transport motor at least during at least part of the period from the moment the disk drive motor is set out of rotation to the subsequent "preready" moment.

* * * * *